United States Patent
Raz et al.

[11] Patent Number: 5,860,137
[45] Date of Patent: Jan. 12, 1999

[54] DYNAMIC LOAD BALANCING

[75] Inventors: Yoav Raz, Newton; Allan L. Scherr, Framingham, both of Mass.

[73] Assignee: EMC Corporation, Hopkinton, Mass.

[21] Appl. No.: 505,615

[22] Filed: Jul. 21, 1995

[51] Int. Cl.[6] .................................................. G06F 9/45
[52] U.S. Cl. ..................................... 711/202; 395/182.06
[58] Field of Search .................................. 395/672, 673, 395/674, 675, 182.02; 711/202

[56] References Cited

U.S. PATENT DOCUMENTS

| | | | |
|---|---|---|---|
| 4,224,664 | 9/1980 | Trinchieri | 364/200 |
| 4,399,504 | 8/1983 | Obermarck et al. | 364/200 |
| 4,480,304 | 10/1984 | Carr et al. | 364/200 |
| 4,527,251 | 7/1985 | Nibby, Jr. et al. | 395/182.6 |
| 4,627,019 | 12/1986 | Ng | 364/900 |
| 4,644,496 | 2/1987 | Andrews | 364/900 |
| 4,709,326 | 11/1987 | Robinson | 364/200 |
| 4,716,528 | 12/1987 | Crus et al. | 364/300 |
| 4,858,116 | 8/1989 | Gillett, Jr. et al. | 364/200 |
| 4,961,134 | 10/1990 | Crus et al. | 364/200 |
| 4,965,719 | 10/1990 | Shoens et al. | 364/200 |
| 5,062,038 | 10/1991 | Jordan, Jr. | 364/200 |
| 5,063,501 | 11/1991 | Jordan, Jr. | 395/725 |
| 5,063,502 | 11/1991 | Jordan, Jr. | 395/725 |
| 5,063,503 | 11/1991 | Jordan, Jr. | 395/725 |
| 5,063,504 | 11/1991 | Jordan, Jr. | 395/725 |
| 5,068,781 | 11/1991 | Gillett, Jr. et al. | 395/325 |
| 5,101,488 | 3/1992 | Rosenthal et al. | 395/425 |
| 5,121,494 | 6/1992 | Dias et al. | 702/2 |
| 5,127,098 | 6/1992 | Rosenthal et al. | 395/650 |
| 5,142,676 | 8/1992 | Fried et al. | 395/425 |
| 5,161,227 | 11/1992 | Dias et al. | 395/650 |
| 5,193,184 | 3/1993 | Belson et al. | 711/4 |
| 5,193,188 | 3/1993 | Franaszek et al. | 395/650 |
| 5,202,971 | 4/1993 | Henson et al. | 395/425 |
| 5,206,939 | 4/1993 | Yanai et al. | 395/400 |
| 5,210,848 | 5/1993 | Liu | 395/425 |
| 5,222,235 | 6/1993 | Hintz et al. | 707/101 |
| 5,226,143 | 7/1993 | Baird et al. | 395/425 |
| 5,226,159 | 7/1993 | Henson et al. | 395/650 |
| 5,255,270 | 10/1993 | Yanai et al. | 371/10.2 |
| 5,257,366 | 10/1993 | Adair et al. | 395/600 |
| 5,263,156 | 11/1993 | Bowen et al. | 395/600 |

(List continued on next page.)

OTHER PUBLICATIONS

"Load Distributing for Locally Distributed Systems", Niranjan G. Shivaratri, Computer Magazine, Dec. 1992 vol. 25, Issue 12.

Shivaratri, et al., "Load Distributing for Locally Distributed Systems," *IEEE*, 33–44 (Dec. 1992).

Copy of PTO Communication dated Aug. 29, 1997.

IEEE, System Sciences, 1989 Annual Hawaii Int'l Conference, vol. II, Jea–Cheol Ryou, "A Task Migration Algorithm for Load Balancing in a Distributed System," pp. 1041–1048.

IEEE Local Computer Networks, 1988 13th Conference, "Dynamic Load Balancing in a Distributed System Using A Send," pp. 172–180.

Copy of International Search Report dated Oct. 9, 1996.

*Primary Examiner*—Majid A. Banankhan
*Attorney, Agent, or Firm*—Fish & Richardson, P.C.

[57] ABSTRACT

A method of operating a data storage system that includes a plurality of host connections for connecting host processors to the data storage system. The data stroage system includes digital storage that is partitioned into a plurality of volumes. The method includes the steps of mapping the plurality of volumes to the plurality of host connections so that each of the host connections has associated therewith a corresponding subset of the volumes and wherein a host processor connected to any given one of the host connections is able to access only the volumes that are mapped to that host connection. In the data storage system, supporting a connect and a disconnect command. The connect command enables a host processor to map a designated one of the volumes to a designated one of the host connections; and the disconnect command enables a host processor to unmap a designated one of the volumes from a designated one of the host connections.

18 Claims, 3 Drawing Sheets

U.S. PATENT DOCUMENTS

| | | | |
|---|---|---|---|
| 5,285,528 | 2/1994 | Hart | 395/725 |
| 5,293,600 | 3/1994 | Vriezen | 395/425 |
| 5,301,290 | 4/1994 | Tetzlaff et al. | 395/425 |
| 5,305,448 | 4/1994 | Insalaco et al. | 395/425 |
| 5,319,780 | 6/1994 | Catino et al. | 395/600 |
| 5,327,556 | 7/1994 | Mohan et al. | 395/600 |
| 5,331,673 | 7/1994 | Elko et al. | 395/575 |
| 5,335,352 | 8/1994 | Yanai et al. | 395/800 |
| 5,339,427 | 8/1994 | Elko et al. | 395/725 |
| 5,355,477 | 10/1994 | Strickland et al. | 395/600 |
| 5,381,539 | 1/1995 | Yanai et al. | 395/425 |
| 5,390,313 | 2/1995 | Yanai et al. | 395/425 |
| 5,467,459 | 11/1995 | Alexander et al. | 711/153 |
| 5,535,116 | 7/1996 | Gupta et al. | 364/134 |
| 5,548,461 | 8/1996 | Balasundaram et al. | 395/800.13 |

| | VOL 1 | VOL 2 | VOL 3 | VOL 4 | VOL 5 | VOL 6 | VOL 7 | VOL 8 |
|---|---|---|---|---|---|---|---|---|
| $T_0$ | 0.5 | 0.5 | 1.0 | 0.5 | 0.5 | 0.2 | 0.3 | 0.5 |

| | VOL 1 | VOL 2 | VOL 3 | VOL 4 | VOL 5 | VOL 6 | VOL 7 | VOL 8 |
|---|---|---|---|---|---|---|---|---|
| $T_1$ | 0.5 | 0.5 | 0.6 | 0.9 | 0.5 | 0.2 | 0.3 | 0.5 |

| | HOST A | HOST B | HOST C |
|---|---|---|---|
| $T_0$ | 2 | 1 | 1 |

| | HOST A | HOST B | HOST C |
|---|---|---|---|
| $T_1$ | 1.6 | 1.4 | 1 |

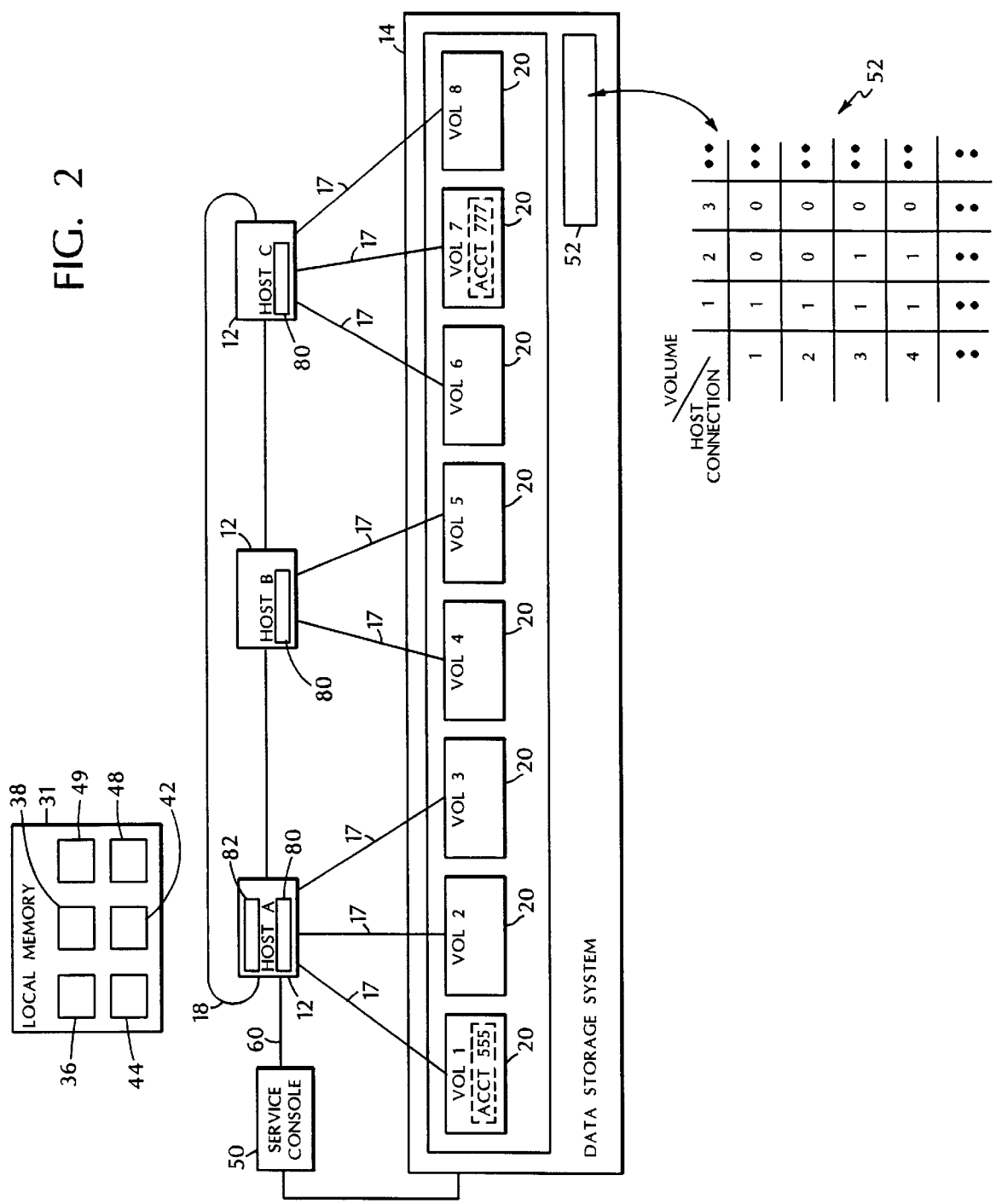

FIG. 6

| VOL.\CONN. | A | B | C |
|---|---|---|---|
| 1 | 1 | | |
| 2 | 1 | | |
| 3 | 1 | 1 | |
| 4 | (1) | 1 | 1 |
| 5 | (1) | 1 | 1 |
| 6 | | 1 | 1 |
| 7 | | | 1 |
| 8 | | | 1 |

| VOL.\HOST | A | B | C |
|---|---|---|---|
| 1 | 1 | | |
| 2 | 1 | | |
| 3 | 1 | | |
| 4 | 1 | 1 | |
| 5 | | | |
| 6 | | | 1 |
| 7 | | | 1 |
| 8 | | | 1 |

FIG. 3A

| VOL.\HOST | A | B | C |
|---|---|---|---|
| 1 | 1 | | |
| 2 | 1 | | |
| 3 | 1 | | |
| 4 | | 1 | |
| 5 | | 1 | |
| 6 | | | 1 |
| 7 | | | 1 |
| 8 | | | 1 |

DYNAMIC LOAD BALANCING

BACKGROUND OF THE INVENTION

The invention relates to load balancing in parallel database systems (e.g. a shared nothing database system).

A parallel database system (DBS) employing a shared-nothing architecture distributes the database among several host processors that run the DBS. Conventionally, such a system is implemented by assigning to each host processor its own set of one or more storage devices, e.g. disk assemblies. Each host processor has exclusive access to its own set of storage devices and it cannot access the storage device of another host.

If a portion of the database that is controlled by a specific host processor is accessed much more frequently than other portions of the database, the host processor that is responsible for that portion of the database becomes a bottleneck and the performance of the entire DBS degrades. Since only one host processor is able to process the accesses to the "hot" portion of the database, the other host processors are unable to contribute to completing the processing. Thus, the other processors go partially idle while the busy host processor completes its work. This results in a very inefficient use of resources and poorer performance than what would be possible if all processors could equally contribute to completing the processing.

One solution to this problem has been to rebalance the DBS by redistributing the "hot" portions of the database among the other hosts processors. Thus, the other host processors will be able to contribute to processing the requests to the hot portions of the database and processing efficiency can be improved significantly. The redistribution is typically accomplished by copying portions of the database from host to host, an operation which is generally very resource and time intensive.

SUMMARY OF THE INVENTION

In one embodiment, the data storage system allows multiple hosts to access the same multiple volumes. In accordance with the invention, load rebalancing is accomplished by properly mapping the database files/extents upon the logical storage volumes and then dynamically establishing host/volume ownership as an agreement among the hosts (e.g. by using any convenient communication channel among the hosts). According to the agreement, a logical volume is accessed only by its owner (i.e., the host processor that is responsible for that logical volume). The agreement maintains the database partitioned among the host processors (e.g. a single owner to each subset of the multiple logical volumes). The agreement can be established by a single host processor which makes all of the decisions on host/volume ownership and the other host processors a priori agree to honor those decisions.

In general, in one aspect, the invention is a method of controlling distribution of processing in a system that includes a plurality of host data processors connected to a data storage system. The data storage system includes a digital memory that is partitioned into a plurality of volumes. The method includes assigning ownership of the volumes to the host processors such that each of the host processors owns a different subset of volumes. The concept of ownership means that a host processor is prohibited from sending I/O requests to any of the volumes which are outside of the subset of volumes which it owns. The method also includes monitoring the I/O requests that are sent to each of the volumes by each of the host processors; from the monitoring information, generating workload statistics indicative of the distribution of workload among the host processors; detecting a workload imbalance; and in response to detecting the workload imbalance, reassigning ownership of the volumes to the host processors so as to change the distribution of workload among the host processors.

Preferred embodiments include the following features. The method further includes storing a desired distribution of workload in memory that is accessible to at least one of the host processors, and during the detecting step, comparing the workload statistics to the desired distribution to detect whether the workload statistics diverge from the desired distribution by more than a threshold amount. The generation of workload statistics involves computing a measure of workload for each of the volumes and then using the measure of workload for each volume to generate the workload statistics for each host processor. The reassigning step involves computing a goodness of fit measure to identify which of the volumes are to be reassigned to which of the host processors. The method also includes distributing work to the host processors in accordance with which processors own which volumes.

In general, in another aspect, the invention is a method of operating a data storage system that includes a plurality of host connections for connecting host processors to the data storage system. The data storage system includes digital memory that is partitioned into a plurality of volumes. The method includes the step of mapping the volumes to the host connections so that each of the host connections has associated therewith a corresponding subset of the volumes, wherein a host processor that is connected to any given one of the host connections is able to access only the volumes that are mapped to that given host connection. The method also includes the steps of supporting within the data storage system (1) a connect command which enables a host processor to map a designated one of the volumes to a designated one of the host connections, and (2) a disconnect command which enables a host processor to unmap a designated one of the volumes from a designated one of the host connections.

In preferred embodiments, the method also includes the steps of sending a connect command from one of the host processors to the data storage system, wherein the connect command designates a first volume and a first host connection; and in response to receiving the connect command, remapping the volumes to the host connections by adding the first volume to the first host connection. The method also includes the steps of sending a disconnect command from one of the host processors to the data storage system, wherein the disconnect command designates a first volume and a first host connection; and in response to receiving the first disconnect command, remapping the volumes to the host connections by removing the first volume from the first host connection. The method further includes monitoring I/O requests that are sent to each of the volumes by each of the host processors; from monitoring information, generating workload statistics indicative of the distribution of workload among the host processors; detecting a workload imbalance; and in response thereto, remapping the volumes to the host connections.

One advantage of the invention is that it performs load rebalancing in a very short time and without the requirement of having to copy any data from one location to another location. It is accomplished simply by reassigning at the host level the ownership of logical volumes within the storage system.

Other advantages and features will become apparent from the following description of the preferred embodiment and from the claims.

BRIEF DESCRIPTION OF THE DRAWINGS

FIG. 2 s a logical view of the parallel database system of FIG. 1;

FIGS. 3A and 3B show the contents of the ownership table before and after the reassignment of volume ownership;

FIG. 6 shows the contents of the table within the data storage system that controls which logical volumes are accessible through which host connections.

DESCRIPTION OF THE PREFERRED EMBODIMENTS

Figures 1, 4A, 4B, 5A, 5B:
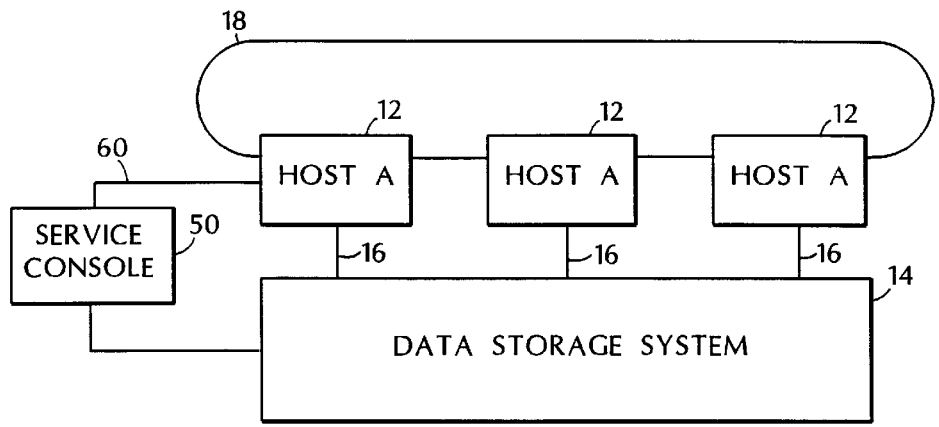
FIG. 1 s a block diagram of a parallel database system.
FIGS. 4A and 4B show the contents of the table used by the managing host processor to store workload statistics for each of the logical volumes within the data storage system.
FIGS. 5A and 5B show the contents of the table used by the managing host processor to store workload statistics for each of the host processors.

The invention will be described with the aid of the parallel database processing system shown in FIG. 1. The system includes a group of host processors 12 that are connected to a central data storage system 14. The host processors 12, also labeled as Host A, Host B, and Host C, are digital processing units such as, for example, PC's, workstations, SMP's (symmetric multiprocessors) or CPU's in a massively parallel processor (MPP). In the described embodiment, their number is limited to three to simplify the following description. However, in a practical system their number is likely to be much larger, as would be the case, for example, in an MPP. Regardless of the number of host processors, the principles of operation would be the same as those described below for the system including only three host processors.

Hosts A–C are each connected to storage system 14 through respective host connections 16. Again, to simplify the discussion, only a single host connection is shown for each host processor. It should be understood, however, that there could in fact be multiple connections between the data storage system and a host processor.

Connecting the host processors 12 together is a high speed bus 18 over which data, instructions, and management information is transferred among the host processors 12.

Data storage system 14 contains the physical memory in which the data (e.g. the records of the database) are stored. Referring to FIG. 2, the physical memory is partitioned into multiple logical volumes 20. Each of the logical volumes 20 is accessible through each of the host connections 16 to the data storage system. That is, each host processor 12 that is connected to the data storage system can see and can access all of the logical volumes 20. The particular manner in which the physical memory within storage system is implemented and how it is partition is not of central importance. In the described embodiment, the data storage system is a Symmetrix 5500, which is an integrated cache disk array sold by EMC Corporation of Hopkington, Mass.

By an agreement that is enforced at the host processor level, the host processors 12 divide up the multiple logical volumes 20 among themselves so that each host processor "owns" a different subset of the multiple volumes 20. That is, by agreement each host processor accesses through its connection(s) to the storage system only those logical volumes 20 which it owns.

In a logical view of the system, as shown in FIG. 2, each host processor 12 is connected to the storage system through multiple logical connections 17, one logical connection 17 for each of the logical volumes 20 that is owned by that particular host processor 12.

When the database is stored in data storage system 14, it is partitioned and distributed among the logical volumes 20. The manner in which the records or the units of data which make up the database are partitioned and distributed among the logical volumes 20 is determined by a database administrator in the database system. The details of how this is done are not particularly important to the invention. Suffice it to say that there are various well known techniques for doing this and since those techniques are described in detail elsewhere in standard references on database design, they will not be discussed here.

In the described embodiment, one of the host processors 12 (e.g. Host A) manages the execution of work that is performed by the DBS. That is, it processes transaction requests and distributes the responsibility for executing those transaction requests among the host processors 12, depending on which processor is responsible for what portions of the database. The managing host processor also monitors the workload at each host processor and it assigns ownership of logical volumes 20 to the host processors 12.

It should be understood, however, that the two just-mentioned management functions (i.e., transaction processing management and workload distribution management) are separate and distinct functions. Though they are are described herein as being handled by a single host processor, responsibility for handling them need not reside in the same host processor. In addition, it may be desirable to have a backup for handling those management functions. Then, in the event that the managing host processor should become inoperative, responsibility for the management function(s) can automatically transfer to the backup host processor.

The host processors 12 obtains from the database system and the operating system certain information that is typically maintained by such systems. For example, the database system (i.e., the software that is managing the database) maintains information about how the logical files of the database are distributed among the logical volumes. And the operating system is aware of the connection_ids for each of the physical connections to the storage system. Host A obtains the identity of the logical volumes that have been configured within the data storage system, the identity of the physical connections to the host processors 12, and a map of how the records or units of data of the database are distributed among the logical volumes 20. With this information, the managing host processor generates in a locally accessible memory 31 a database table 36 which maps the database records to the logical volumes 20 and an ownership table 38 which assigns ownership of the logical volumes to the host processors 12. All host processors have access to both the database table and the ownership table in the locally accessible memory. Alternatively, each host processor can keep its own copies of each of these tables. The approach that is selected in any given system is an implementation detail.

When the system is first set up, ownership of the volumes is distributed among the host processors in some predefined manner. The object of course is to distribute ownership in a manner that seems likely to result in a balanced workload among the host processors when running the database system. The initial assignment of ownership can be evenly distributed among the host processors 12 or it can take into account information what is known about the database system from prior experience. It may also be desirable when assigning ownership to take into account the relative processing power of the different host processors 12. For example, if Host A has characteristically higher performance capability than the other host processors, then it may be appropriate to assign a larger portion of the database (e.g. more volumes) to Host A as compared to the other host processors. The initial assignment of ownership can also take into account prior knowledge about portions of the database that may tend to be "hot spots". In that case, it would be desirable to assign volume ownership so as to distribute responsibility for those portions of the database among multiple host processors.

In general, in the described embodiment, the processing and execution of DBS tasks or transaction requests are handled as follows. Transaction requests that are generated by the DBS are sent to the managing host processor. Upon receiving a transaction request, Host A gives it a transaction id and then parses it into subtasks, each of which is identified by the transaction id and each of which involves a data access operation relating to a separate unit of data or record within the database that is stored in the data storage system. The details for how these operations are performed are well known to persons skilled in the art of database systems and therefore will not be presented here.

Once the transaction has been parsed into subtasks, the managing host processor then distributes the subtasks among the host processors 12 according to which host processor owns the records or units of data that will be accessed during execution of the subtask. For each subtask, Host A refers to database table 36 to determine which logical volume contains the unit of data on which the operation is to be performed. After it has identified the logical volume, it refers to ownership table 38 to determine which host processor 12 owns the logical volume that contains the unit of data (i.e., it identifies the host processor that is responsible for executing operations involving the unit of data).

Each of the host processors 12 executes the subtasks which it receives and returns the results, labeled by the transaction id, back to the managing host processor. The managing host processor, using the transaction id's to identify what results go with what transactions, assembles the results that it receives from the other host processors. When all subtasks for a given transaction request are accounted for, the managing host processor sends a result (e.g. an acknowledgment, computed data, or an entire file of data) back to the user indicating that the execution of that transaction request is complete.

Typically, there is a constant stream of transaction requests arriving at each of the host processors. Each of these requests is handled in the way just described.

In addition to aid in managing the processing of the transaction requests, each of the host processors also monitors its workload and reports this information to the host processor that is managing workload distribution.

Each host processor has an execution queue in which the subtasks which it is to process are stored. When the host processor performs a subtask from the queue which requires access to the data stored in one of its logical volumes, the host processor generates and sends an I/O request to the data storage system. The I/O request identifies the logical volume to which it is directed, which information is learned from the database system.

Each host processor 12 monitors its workload to determine how busy the portions of the database for which it is responsible are. In this particular example, each host processor counts the number of I/O requests that it sends to each logical volume that it owns. There are a variety of ways known to persons skilled in the art for collecting, maintaining, and reporting such statistics. The particular approach that is adopted is not central to this invention. According to one approach, the host processor includes a set of registers 80, one for each of the logical volumes that it owns. It counts the I/O requests that are sent to each logical volume and accumulates these counts in the respective registers 80.

Periodically, in response to being polled by the managing host processor, each host processor reports the accumulated counts contained in these registers 80 to the managing host processor, which stores the reported counts in another set of registers 82. The frequency of the polling is flexibly determined. It can be performed as frequently as every few minutes or it can be performed less frequently, for example, on a daily basis, on a weekly basis, or even less frequently than that. Note, however, that it may be desirable to perform the polling frequently enough to be able to capture short duration deviations in the workload if such deviations are likely to occur.

When a host processor reports its counts to the managing host processor, it clears its registers 80, and it begins its count for the next period starting from zero. Thus, the count that is reported to the managing host processor in response to each poll is the number of I/O requests that have been sent to the data storage system for the identified volume since the immediately preceding poll.

The managing host processor computes a normalized I/O request rate for each volume. It does this by dividing the count stored in the appropriate one of its registers 82 by the time that has elapsed since the register count was last updated and by the total count for all volumes. After having obtained a normalized rate for each volume, it then computes the total normalized I/O request rate for each host processor by adding the normalized I/O request rates for all of the logical volumes that are owned by that host processor.

Of course, workload can be measured in ways other than by measuring I/O request rate. For example, one could use such measures as the length of an execution queue at each host processor, the service times for each I/O request, or CPU utilization, or any combination of all or some of the above. Such alternative measures of workload distribution fall within the scope of the present invention.

The managing host processor uses the resulting normalized I/O request rates for each host processor to detect imbalances in the distribution of workload among the host processors. It does this by comparing the monitored workload distribution to a desired workload distribution. If the managing host processor detects an imbalance, e.g. if it detects that one or more host processors are processing a significantly higher proportion of the I/O requests than they were intended to process or than is desirable, it executes a load rebalancing routine to eliminate the workload imbalance. The rebalancing routine analyzes the load distribution among the logical volumes to identify which logical volumes can be transferred to other host processors so as to reduce or eliminate the imbalance and it then transfers ownership of the identified volumes by updating the entries in ownership table 38.

The desired workload distribution which is the standard against which actual workload distribution is compared is predetermined by the user. This information is then stored in a load distribution table 42 within memory 31 for use by the managing host processor. A typical desired workload distribution might be one that is evenly distributed among all of the host processors. On the other hand, the desired workload distribution might also take into account the relative processing power of each of the host processors. Thus, for example, if one host processor has higher processing speed than the other host processors, then it might be desirable to expect it to handle a relatively higher proportion of the workload as compared to the other host processors.

The managing host processor uses a "goodness of fit" measure to detect an imbalance. There are many different measures, well known to persons skilled in the art of statistical analysis, of how well one set of numbers fits another set of numbers. An example of a commonly used measure which would be appropriate is least mean squares. It should be understood that the invention covers the use of any of the possible measures of imbalance. In the described embodiment, a very simple measure is employed. The managing host processor simply computes the percentage by which the normalized workload at each host processor diverges from the desired level, as defined in load distribution table 42. If the normalized workload at any host processor diverges by more than a threshold amount or percentage, then the managing host processor executes a load rebalancing routine.

The load rebalancing routine examines the workload statistics for the logical volumes and finds the reassignments of volume ownership that yield the best improvement in performance. The problem which the load rebalancing routine solves is a straightforward optimization problem for which many alternative approaches exist. The particular approach that is selected is not of central importance to the invention. Any optimization technique which results in a redistribution of load that reduces the imbalance and improves overall system performance (e.g. throughput) would be satisfactory. It is well within the skills of a person of ordinary skill in the relevant art to write such a program and thus it is not necessary to present further details.

To identify the reassignment of volume ownership that yields the best results, the load rebalancing routine also uses a measure of goodness of fit. The selected measure quantifies how closely the anticipated workload of a proposed reassignment of volume ownership approaches the desired workload distribution. As with the measure that is used for detecting an imbalance, any one of many existing well known alternative measures would be acceptable. The described embodiment uses a least mean squares measure.

When the volume ownership is modified, some procedure must be employed to ensure continuity in pending work processing during the change in ownership. One approach is to use two ownership assignment tables, the first table, which contains the old ownership assignments, is used for all transaction requests that are received at the managing host processor prior to a specified time and the second table, which contains the new ownership assignments, is used for all transaction requests that are received after the specified time. However, it may be desirable, or even necessary, that the reassignment of volume ownership avoid causing a situation where two host processors are accessing the same volume simultaneously. A simple approach which achieves that objective is to stop assigning transactions to host processors, wait until all pending transactions are complete, reassign volume ownership, and then commence assigning transactions using the new ownership assignments.

A simple example will now be presented to further clarify the operation of a system embodying the invention and illustrate how it detects and corrects load imbalances. This example involves a financial database made up of different accounts, including two accounts identifies as Acct. 555 and Acct. 777. The records of the database are distributed among the eight logical volumes shown in FIG. 2. In this case, the records for Acct. 555 are stored in Vol. 1 and the records for Acct. 777 are stored in Vol. 7. Host A, which is the managing host processor, receives a continuous stream of transaction requests from the DBS, one of which involves crediting $100 to Acct. 555 and debiting $100 from Acct. 777.

The ownership of the volumes is initially as depicted in FIG. 2. Host A owns Vols. 1–3, Host C owns Vols. 4–5, and Host C owns Vols. 6–8. This information is contained in ownership table 38, a copy of which is shown in FIG. 3A.

We shall use the specific transaction involving Accts. 555 and 777 as an example of how all of the requests are in general processed. Host A parses this transaction request into two subtasks, namely, a credit operation involving Acct. 555 and a debit operation involving Acct. 777. Then, Host A assigns the credit operation to itself since it owns Vol. 1 in which Acct. 555 is stored, and it sends the debit operation to Host C, which owns Vol. 7 in which Acct. 777 is stored. Hosts A and C each processes its portion of the transaction. That is, Host A credits Acct. 555 with $100 and Host C debits Acct. 777 by $100. When processing is complete, each host processor sends an acknowledgment (along with any results of the operation where appropriate) back to Host A. Host A assembles the results received from Host C and from its own execution and when it determines that all pieces for a given transaction are complete, it sends a result (e.g. an acknowledgment) to the user.

Each of the requests in the stream of transaction requests from the DBS are handled in a similar manner. Typically, this will result in continual flow of subtasks to Host A–C. Each of the host processors monitors the number of I/O requests that it makes to each of the logical volumes which it owns and stores this count in internal registers 80. Periodically, Host A polls all of the host processors for the contents of their internal registers 80. Host A collects the accumulated statistical data that is reported back to it from the other host processors and stores this information in its registers 82 on a per volume basis.

Host A then computes a normalized request rate for each volume. In the present example we have selected, solely for the purposes of illustration, a normalization factor which equals 0.25 times the total I/O request rate for all of the volumes (i.e., the sum of the combined normalized rates equals 4). Host A stores the computed normalized I/O request rates for each logical volume in a table 44. In the present example, we assume that for a poll conducted at a time $T_0$, the normalized I/O request rates are as shown in FIG. 4A.

Using the information stored in table 44, Host A then computes a normalized I/O request rate for each host processor and stores that information in another table 48 (see FIG. 5A). For any given host processor, it computes the normalized I/O request rate by summing the normalized I/O request rates for each the logical volumes owned by that host processor. Thus, for example, the normalized I/O request rate for Host C is equal to the sum of the normalized I/O request rates for Vol. 7 and Vol. 8, the two logical volumes owned by Host C. For the statistics gathered at time To, the normalized I/O request rates for Hosts A, B and C are 2, 1, and 1, respectively.

We further assume for purposes of this example that Host A has twice the processing speed of the other host processors. Thus, the desired or balanced workload distribution, taking into account the processing capabilities of the host processors, is defined to be 2:1:1. That is, Host A is expected to be able handle twice the rate of I/O requests as each of the other processors. This information is stored in load distribution table 42 for use by Host A to detect workload imbalances.

In our example, note that the workload distribution at time $T_0$ is equal to the desired distribution that is stored in load distribution table 42. Host A compares the actual distribution to determine whether an imbalance exists that would require a reassignment of volume ownership. In this example, Host A uses a simple technique to detect an imbalance. For each host processor, Host A compares the actual normalized I/O request rate with the desired normalized I/O request rate. If the actual request rate for any host processor differs from the desired request rate by more than some threshold amount (e.g. 30%), it executes the load rebalancing routine to identify which logical volumes to reassign to bring the system back into balance. For the load statistics collected at time $T_0$, Host A will not detect an imbalance that requires a reassignment of volume ownership.

Assume, however, that for the next polling cycle at time $T_1$ the normalized I/O request rates for the logical volumes have changed as indicated in the updated table 44 shown in FIG. 4B. The host processor computes the new normalized I/O request rates for each host processor and updates table 48 with these new rates (see FIG. 5B). In the time period that has elapsed since the last examination of workload statistics, the workload at Host B has increased relative to the other processors and the workload of Host A has decreased.

When Host A compares the current workload statistics to the target, it will detect that the normalized workload at Host A is 50% higher than the target level. Thus, Host A invokes the load rebalancing routine which examines the workload at each logical volume and determines which reassignments can be made to bring the system back toward a more optimum workload distribution. If alternative possibilities exist for rebalancing the system, it selects the reassignment of volume ownership that produces the best results (i.e., a workload distribution that is closest to the desired workload distribution specified in table 42).

In this example, it should be readily apparent that a transfer of ownership of Vol. 5 to host A would be one reassignment plan that would produce a more balanced distribution. Another solution which produces the same results would be to transfer ownership of Vols. 5 and 8 to Host A and transfer ownership of Vol. 3 to Host C. The managing host processor selects one of the best choices and implements the ownership reassignment by updating ownership table 38. In this case, the managing host processor reassigns Vol. 5 to Host A as indicated in table 38 shown in FIG. 3B.

It should be noted that the finer the partitioning of the memory into logical volumes, the more likely it will be that a detected load imbalance can be remedied. For example, if all I/O requests involve data records that are stored in a single logical volume, then it will do no good to simply move ownership of that logical volume to another host processor. Such a transfer of ownership would simply transfer the problem to another host processor. It is necessary to spread ownership of the relevant data records out among multiple host processors. This is more likely to be possible if the size of the logical volumes is small enough to ensure that the hot portions of the database will be spread out among multiple logical volumes.

In another embodiment, the storage system limits the number of logical volumes that a host processor can see (i.e., access) over its connection(s) to the storage system. In other words, if the system is partitioned into m logical volumes, then a host processor can see only a subset n of those logical volumes, where n <m.

The previously mentioned Symmetrix 5500 is an example of a storage system which places a system limit on the number of logical volumes that can be accessed over any host connection. Referring to FIG. 2, the Symmetrix 5500 includes a service console 50 through which the user can configure the memory into logical volumes during system setup. By entering an appropriate set of commands through console 50, the user can map the logical volumes to the host connections, i.e., the user can designate which logical volumes are accessible through which host connections. The mapping of host connections to logical volumes may be overlapping but the number that is mapped to any given host connection cannot exceed the system limit. If the system has been configured to have more logical volumes than that system limit, then no host processor is able to see all volumes through any given host connection. Thus, if a particular logical volume cannot be accessed by a particular host processor, to make it accessible it must be remapped to the host connection to which the host processor is connected. The Symmetrix 5500 enables the user to perform this remapping of logical volumes to host connections by entering the appropriate commands through the service console.

It should be apparent that for each host processor connected to the storage system, the set of logical volumes for which it can have potential ownership is limited to the set of logical volumes which it can see through its connection to the host. The previously-described load rebalancing routine can only make ownership reassignments that are permitted by the mapping within the storage system of logical volumes to host connections. If the proposed reassignment of ownership requires a transfer of ownership of a logical volume to a host processor that cannot see or access that logical volume, then that reassignment will not be possible. For example, referring to FIG. 2, the load rebalancing routine may determine that the greatest improvement in workload distribution involves reassigning ownership of Vol. 7 to Host A. However, if Vol. 7 is not accessible to Host A because it is not mapped (i.e., connected) to the host connection to which Host A is connected, then that reassignment will not be permitted. In short, the reassignments that are made at the host level are constrained by the original mapping within the storage system of logical volumes to host connections.

Referring again to FIG. 2, the mapping of host connections to logical volumes is controlled by the entries within a connection table 52 within the data storage system 14. Each host connection is represented in connection table 52 by a corresponding row and each logical volume is represented by a corresponding column. Through the service console 50, the user can specify and modify which logical volumes are connected to which host connections by setting and/or clearing appropriate flags within connection table 52. The primary restriction on the mapping of logical volumes to host connections is that no host connection can be connected to more than the maximum limit of logical volumes.

The contents of connection table 52 specifies the potential ownership for each host connection and thus for each host processor that is connected to the data storage system. That is, a volume ownership reassignment at the host level can only be made so long as the logical volume which is to be reassigned to a given host processor falls within the set of logical volumes that are connected to the host connection(s) for that host processor.

To fully implement the above-described load balancing technique in this system, a programmable switching mechanism is added to the data storage system. The programmable switching mechanism enables the managing host processor through commands which it send to the data storage system to reconfigure the data storage system by changing the set of logical volumes that are connected to each host connection.

The switching mechanism is implemented by at least two command functions which are supported by the data storage system 14 and which enable a host processor to reconfigure the mapping that is stored within connection table 52. The two commands are:

disconnect(connection_id, volume_id)

connect(connection_id, volume_id)

The connection_id identifies the channel of the storage system and, of course, the volume_id identifies the logical volume within the memory of the storage system.

The commands are sent to the storage system over an out-of-band connection 60 to the service console 50. Alternatively, the commands can be sent to the storage system over an existing host connection.

In response to receiving a disconnect command from a host, the storage system removes the specified logical volume from the identified host connection. The storage system accomplishes this by simply clearing the appropriate flag in connection table 52. Once the flag is cleared, the host processor that is connected to that host connection will not be physically able to access the volume which has been cleared.

In response to receiving a connect command, the storage system first checks whether an additional logical volume can be added to the identified host connection. That is, it checks whether the number of existing logical volumes that are already accessible through that host connection is at the maximum limit. If the number is below the maximum limit, the storage system maps the logical volume to the identified host connection by setting the appropriate flag in table 52. On the other hand, if the number of volumes which are mapped to the identified host connection is at the maximum limit, the storage system reports an error to the requesting host processor. Before any additional logical volumes can be mapped to that host connection, the flag for at least one volume attached to that host connection will first have to be cleared using a disconnect command.

Again using the system illustrated in FIG. 2, we present the following simple example of how the disconnect and connect commands are used to accomplish load balancing. Assume, for purposes of this example, that each channel is able to have access to at most four volumes. Of course, in reality the number of actual volumes and the number of volumes for which access will be supported for each connection will generally be much larger than this; however, the principles can more easily and just as fully be illustrated with using these smaller numbers.

Also further assume that the system has been initially configured to connect logical volumes to host processors as indicated by the flags in connection table 52 of FIG. 6. Each host connection is connected to the maximum number of logical volumes that is permitted by the data storage system (i.e., 4) and the mappings of volumes to host connections are overlapping. That is, the host connection to which Host A is connected can access Vols. 1–4, the host connection to which Host B is connected can access Vols. 36, and the host connection to which Host C is connected can access Vols. 5–8.

As explained previously, in response to detecting the load imbalance indicated at time $T_1$, the managing host processor invokes the load rebalancing routine which determines that ownership of Vol. 5 should be reassigned to Host A to redistribute and balance the load. However, since Vol. 5 is not visible to Host A, the managing host processor issues a connect command to the data storage system to change the mapping of logical volumes to host connections so that Vol. 5 is accessible through its host connection.

In addition to the previously identified service that are provided by the data storage system, the data storage system also provides a service which enables a host processor to obtain the contents of the connection table 52. The managing host processor uses this services to obtain a local copy of the information stored in connection table 52 which it stores in a locally accessible connection table 49.

Before issuing a connect command to the storage system to connect a specified volume to the host connection for Host A, Host A references its copy of the connection table 52 to determine whether another logical volume can be mapped to its host connection or whether adding another logical volume will violate the maximum number permitted by the data storage system. In this case, it is apparent that the connection already has the maximum number of logical volumes assigned to the host connection. Thus, in order to add Vol. 5 to the host connection, Host A must first issue a disconnect command removing another volume from the connection. Since both Host A and Host B have are connected to Vol. 4, but Host A does not have ownership of Vol. 4, load distribution will be unaffected by removing Vol. 4 from the connection to Host A. Thus, Host A issues a disconnect command to the storage system to disconnect Vol. 4 from its host connection and it updates its connection table 49 to record the change. After the number of logical volumes connected to that host connection has been reduced to below the maximum number of four, Host A then issues a connect command to connect Vol. 5 to its host connection.

With the connections of logical volumes to host connections adjusted appropriately, Host A can then reassign ownership of the volumes to redistribute the workload as previously described. In general, it is particularly important that transaction processing by the host processors be complete before the mapping of volumes to host connections is changed. In many instances, the remapping is likely to prevent a host processor from be able to access a logical volume that it was previously sending I/O requests to.

Other embodiments are within the following claims. For example, it should be noted that one could use a locking mechanism at the host level (e.g. a lock protocol for preventing more than one host from access the same logical volume at the same time) to implement the ownership agreement at the host level. Such a lock protocol is basically another mechanism for establishing an agreement among users (e.g. hosts) regarding which user can access a particular resource at any given time. In the present case, the lock would be a volume lock.

What is claimed is:

1. A method of operating a data storage system that includes a plurality of connections for connecting external processors to said data storage system, said data storage system including digital storage that is partitioned into a plurality of volumes, wherein said plurality of volumes is mapped to said plurality of connections so that each of said plurality of connections has associated therewith a corresponding subset of said plurality of volumes, wherein an external processor connected to any given one of said plurality of connections is able to access only the volumes that are mapped to that given connection, said method comprising:

at said data storage system, receiving a remapping instruction from any one of said plurality of external processors; and in said data storage system, in response to receiving said remapping instruction remapping said plurality of volumes to said plurality of connections.

2. The method of claim 1 further comprising sending a first connect command from one of said external processors to the data storage system, said first connect command designating a first volume and a first connection; and in response to receiving said first connect command, remapping said plurality of volumes to said plurality of connections by adding said first volume to said first connection.

3. The method of claim 1 further comprising sending a first disconnect command from one of said external processors to the data storage system, said first disconnect command designating a first volume and a first connection; and in response to receiving said first disconnect command, remapping said plurality of volumes to said plurality of connections by removing said first volume from said first connection.

4. The method of claim 1 further comprising:

monitoring I/O requests that are sent to each of said plurality of volumes by each of said plurality of external processors;

from information obtained by said monitoring step, generating workload statistics indicative of the distribution of workload among said plurality of external processors;

detecting a workload imbalance in said workload statistics; and in response to detecting said workload imbalance, remapping said plurality of volumes to said plurality of connections.

5. The method of claim 4 further comprising:

assigning ownership of the plurality of volumes to the plurality of external processors such that each of said external processors owns a different subset of said plurality of volumes, wherein each of said host processors is prohibited from sending I/O requests to any of said plurality of volumes which are outside of the subset of volumes which it owns; and in response to detecting said workload imbalance, reassigning ownership of the plurality of volumes to the plurality of external processors so as to change the distribution of workload among said plurality of external processors.

6. The method of claim 4 further comprising storing a desired distribution of workload in memory that is accessible to at least one of the plurality of external processors, and wherein said detecting step comprises comparing said workload statistics to said desired distribution to detect said imbalance.

7. The method of claim 6 wherein said detecting step comprises detecting whether the workload statistics diverge from said desired distribution by more than a threshold amount.

8. The method of claim 5 wherein the step of generating workload statistics comprises computing a measure of workload for each of said plurality of volumes and then using the measure of workload for each volume to generate said workload statistics for each of said plurality of external processors.

9. The method of claim 8 wherein said reassigning step comprises computing a goodness of fit measure to identify which of said volumes are to be reassigned to which of said plurality of external processors.

10. The method of claim 5 further comprising distributing work to said plurality of external processors in accordance with which of said plurality of external processors own which volumes.

11. The method of claim 9 wherein the remapping step is performed so as to make possible the reassignment of ownership that is to be implemented during the reassigning ownership step.

12. The method of claim 1 wherein the step of receiving a remapping instruction from any one of said plurality of external processors comprises receiving said remapping instruction over one of said plurality of connections.

13. A method of operating a data storage system that includes a plurality of connections for connecting external processors to said data storage system, said data storage system including digital storage, said method comprising:

in said data storage system, supporting a partitioning mechanism which enables a user to partition said digital storage into a plurality of volumes;

in said data storage system, supporting a mapping mechanism which enables the user to map said plurality of volumes to said plurality of connections so that each of said plurality of connections has associated therewith a corresponding subset of said plurality of volumes, wherein an external processor connected to any given one of said plurality of connections is able to access only the volumes that are mapped to that given connection; and in said data storage system, supporting a remapping function which in response to receiving a remapping command from any one of said external processors remaps said plurality of volumes to said plurality of connections.

14. The method of claim 13 wherein said step of supporting a remapping function comprises remapping said plurality of volumes to said plurality of connections in response to receiving the remapping command over one of said plurality of connections.

15. The method of claim 14 wherein said remapping command is a connect command and wherein said supporting step comprises, in response to receiving said connect command, mapping a designated one of said volumes to a designated one of said connections.

16. The method of claim 14 wherein said remapping command is a disconnect command and wherein said supporting step comprises, in response to receiving said disconnect command, unmapping a designated one of said volumes from a designated one of said connections.

17. A data storage system comprising:

digital storage that is partitioned into a plurality of volumes;

a plurality of connections for connecting a plurality of external processors to said data storage system;

means for mapping said plurality of volumes to said plurality of connections so that each of said plurality of connections has associated therewith a corresponding subset of said plurality of volumes, wherein an external processor connected to any given one of said plurality of connections is able to access only the volumes that are mapped to that given connection; and means responsive to receiving a remapping command from any one of said plurality of external processors for remapping said plurality of volumes to said plurality of connections.

18. The data storage system of claim 17 where the remapping means is responsive to receiving the remapping command over one of said plurality of connections.

* * * * *